Nov. 21, 1950 — W. R. WEEKS — 2,531,180
AUTOMATIC CONTROL FOR WATER HEATERS
Filed Dec. 17, 1948

Inventor:
Walter R. Weeks,
by Sheridan L. Riggs
His Attorney.

Patented Nov. 21, 1950

2,531,180

UNITED STATES PATENT OFFICE 2,531,180

AUTOMATIC CONTROL FOR WATER HEATERS

Walter R. Weeks, Hamden, Conn., assignor to General Electric Company, a corporation of New York Application December 17, 1948, Serial No. 65,937

5 Claims. (Cl. 219—43)

My invention relates to liquid heating vessels and more particularly to the type of liquid heating vessel which may be used in conjunction with an automatic electric stove or heater such as described in my U. S. Patent 2,287,583, granted June 23, 1942, and U. S. Patent 2,445,591 granted to E. C. Sullivan on July 20, 1948.

In the above patents, there is disclosed a control means whereby a reduction of heat applied to a coffee maker is automatically effected during the coffee infusion period. More specifically, a pair of cooperating magnetically attracted members are automatically separated during the coffee making process in order to operate a switch which effects the proper reduction of heat.

It is an object of my present invention to provide an improved device for automatically effecting this relative movement between these magnetically attracted members.

In general, my invention contemplates an improved organization of control elements comprising a float within a water heating vessel which operates when sufficient vapor pressure is generated under the float to lift a magnetic member away from a second magnetic member, located within an associated electric stove, and initially held by magnetic attraction in a position adjacent the first member. When the first magnetic member is lifted, the second member is released from its magnetic attraction to the first member and moves to open a switch reducing the amount of heat applied. A plurality of vents or escape ports are provided in the float in order to regulate the acceleration of vapor pressure under the float and prevent the premature elevation of the first magnetic member.

Figure 1:
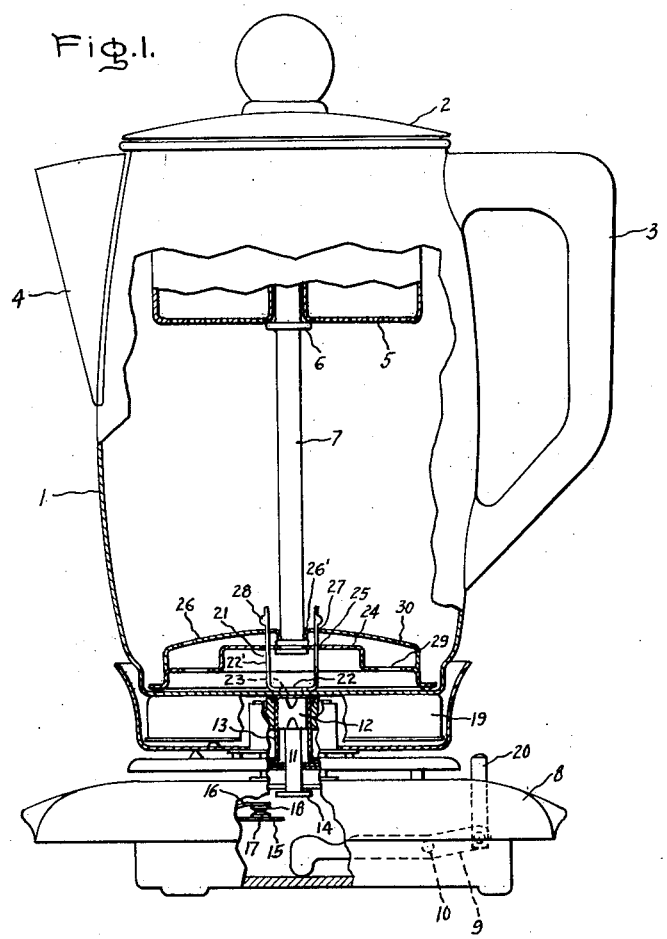
Figure 2:
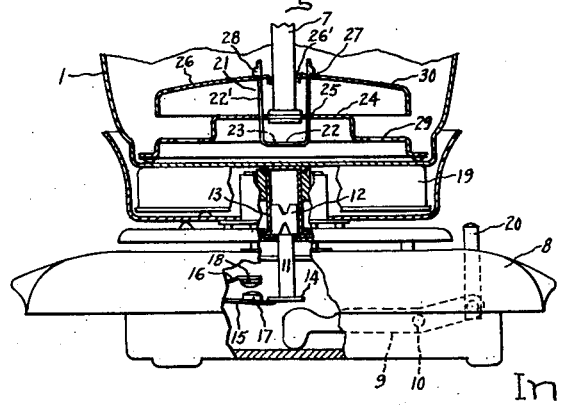

For a more complete understanding of my invention reference should be made to the accompanying drawing in which Fig. 1 is a vertical view partly in section of an exemplary coffee maker embodying my invention together with an electric stove which may be used in conjunction therewith, showing the relative positions of the control elements when the stove is first energized. Fig. 2 is a similar sectional view showing relative positions of the control elements immediately after the heat has been reduced.

Referring to the drawings, I have shown my invention in one form as applied to a conventional coffee percolator 1 having a cover 2, a handle 3, a spout 4 and a coffee basket 5 resting on an annular ring 6 attached to the upper portion of a water transfer tube 7. The percolator is shown resting on an automatic stove 8 of the type described and claimed in the aforementioned U. S. patents. In this stove, an actuating lever 9, fulcrumed on pin 10, has one end positioned beneath a vertically arranged plunger 11 which is attached to a magnetic member such as a cylindrical magnet 12 preferably of the sintered aluminum-nickel-cobalt type. The magnet 12 is slidably fitted within a cylinder 13 of approximately double the height of magnet 12. Plunger 11 has an annular head 14 encircling its lower end which makes contact with a movable arm 15 of a switch 16 when the magnet is at the lower end of cylinder 13 as illustrated in Fig. 2. In this position, a contact 17 on the arm 15 is held away from a fixed contact 18, in order to effect a proper reduction of heat by de-energizing a main heating circuit of a heating element 19 of stove 8.

When starting button 20 of lever 9 is depressed, the plunger 11 and magnet 12 are forced upward by the end of lever 9, and the annular head 14 of plunger 11 releases the arm 15 which moves to close contacts 17 and 18, as illustrated in Fig. 1, thereby energizing the main heating circuit.

The magnet 12 is held in this raised position by its magnetic attraction to a magnetic armature 21, preferably nickel, resting on the bottom of percolator 1 as illustrated in Fig. 1. The armature 21 preferably has the form of the letter U comprising a flat base 22 and a pair of parallel arms 22' extending perpendicular to the base 22. A plurality of transverse holes 23 are formed in base 22 in order to increase the density of magnetic flux and quickly saturate base 22 when magnet 12 is in this raised position. Since base 22 operates at saturation, the attraction between the armature 21 and magnet 12 is stabilized and any small changes in their relative positions due, for example, to the varying thickness of the bottom walls of different percolators, are compensated. Holes 23 also facilitate the passage of water to the transfer tube 7 when the armature 21 is elevated.

In the foregoing description, it is to be understood that although I have preferably located the magnet within the electric stove 8, there is no compelling necessity for this particular arrangement. Either magnetic member of the cooperating magnet and armature might be within the stove, with the other cooperating magnetic member in the heating vessel.

A hot-water pump 24 functioning in the usual manner to force heated water up tube 7 is secured to the lower end of transfer tube 7 and rests on the bottom of percolator 1. Pump 24 has a pair of slots 25 through which the arms 22' of armature 21 are slidably inserted and preferably, has a bell-like configuration adapted to act as a base supporting the tube 7 and the coffee basket 5.

A float 26, as illustrated, may comprise a bell or an inverted cup having a centrally positioned hole 26' and a pair of slots 27 slidably to accommodate transfer tube 7 and arms 22' respectively. Although many different means may be employed to attach the float 26 to the armature 21, I prefer to provide a pair of flanges 28 projecting from the upper portion of the arms 22' above float 26. If float 26 is elevated, it makes contact with flanges 28 and carries armature 21 upward. This elevation may be continued until the base 22 of armature 21 reaches the bottom of tube 7.

A plurality of apertures 29 acting as vents or ports may be formed in the body portion of pump 24 in order to facilitate the passage of vapor and steam to the float 26 when the liquid within the percolator approaches or reaches its boiling point. The float 26 also has a plurality of apertures 30 acting as relief vents which act principally as an escape path for the rising vapor in order to regulate the resulting pressure under the float. Apertures 30 also function to provide an escape path for air that may be trapped under float 26 when the float 26 is inserted into a water-filled percolator or when the water is added after the float 26 has been placed within the percolator 1.

In the operation of my invention, a quantity of water is poured into percolator 1 which is placed on stove 8. A suitable quantity of coffee grounds are placed in coffee basket 5 and starting button 20 of lever 9 is depressed. The other end of lever 9 is consequently elevated forcing magnet 12 to the top of cylinder 13. Coincidentally, the annular head 14 of plunger 11 releases arm 15 which moves to close contacts 17 and 18 thereby energizing a main heating element 19 in the stove 8. The magnet 12 is held in this raised position due to its magnetic attraction to the magnetic armature 21 resting on the bottom of percolator 1.

As the water in the percolator 1 approaches its boiling point, the hot water pump 24 functions in the usual manner to carry the water up the transfer tube 7 and into the perforate coffee basket 5 where the coffee grounds are contained. The vents 29 in the body of pump 24 allow the water vapor generated within the pump 24 to rise through the water. This water vapor is trapped and collected under the inverted cup-shaped body of float 26. When the circulation of the liquid within the percolator has continued for a suitable coffee infusion interval, sufficient vapor pressure is generated under the float 26 to lift the float 26 with sufficient force to pull the armature 21 away from the magnet 12. Magnet 12 then drops to the bottom of cylinder 13 causing annular head 14 of plunger 11 to depress movable arm 15; opening contacts 17 and 18 and breaking the main heating circuit. Residual heat from the stove 8 continues the infusion action to completion.

The relief vents 30 in the float allow some of the steam and vapor under the float to escape in order to prevent the premature elevation of armature 21. Since the action of float 26 depends primarily upon the degree of agitation of the liquid at the bottom of the percolator 1, the vents in the pump and in the float can be easily constructed by those skilled in the art to give an ideal coffee infusion interval even though the amount of liquid in the percolator is varied from full capacity down to a relatively low level.

While I have shown my invention as applied to a coffee percolator, it is equally applicable to other types of water heating vessels such as the usual vacuum type coffee maker having a dispensing receptacle, an infusion receptacle and a suitable connecting tube. Since many modifications may be made, it is to be understood that I do not wish to be limited to the particular embodiment of my invention that I have herein described, and I, therefore contemplate by the appended claims to cover such modifications as fall within the true spirit and scope of my invention.

What I claim as new and desire to secure by Letters Patent of the United States is:

1. In a coffee maker having a water heating vessel and a liquid transfer tube extending upwardly therein, a water pump on the bottom of said vessel for delivering water from said vessel to said transfer tube, a stove for applying heat to said vessel, means responsive to vapor pressure generated in a liquid within said vessel for automatically reducing said heat comprising, an armature within said vessel, a magnetic member within said stove magnetically co-operating with said armature, said magnetic member controlling the heat applied to said vessel by its movement from a first heat-applying position to a second heat-reducing position, said magnetic member being held in said first position by magnetic attraction to said armature, means for elevating said armature thereby releasing said magnetic member to move to said second controlling position comprising, a float encircling said tube and attached to the upper portion of said armature, said float being constructed and arranged to trap rising water vapor under its bottom surface thereby to elevate said armature, and said pump having auxiliary water vapor transfer means for delivering water vapor under pressure to said float to cause it to rise.

2. In a coffee maker having a water heating vessel and a liquid transfer tube within said vessel, the combination with a stove having an electric heating element and a magnet arranged to control the current to said heating element by its movement from a first energizing position to a second deenergizing position, of an armature resting on the bottom of said vessel adjacent said magnet, said armature having a pair of parallel arms extending on opposite sides of said tube, said magnet being held in its first position by its magnetic attraction to said armature, and means responsive to vapor pressure generated within said vessel for elevating said armature to permit said magnet to drop to its second position comprising a bell encircling said tube and attached to the upper portion of said arms, said bell having a plurality of relief vents therein for regulating the rate of acceleration of vapor pressure generated under said bell.

3. A water heating and coffee infusion vessel, means for applying heat to said vessel, means for automatically reducing said heat responsive to vapor pressure generated in a liquid within said percolator comprising, a switch controlling said heating means, a magnet arranged to operate said switch by its movement from a first energizing position and a second deenergizing position, an armature resting on the bottom of said vessel and maintaining said magnet in said first position by its attraction thereto, a hot water pump in the bottom of said vessel having vapor discharge ports, and a movable float attached to said armature having an inverted cup configuration adapted to trap thereunder vapor issuing from said ports so that it is elevated by said vapor, whereby it elevates said armature and releases said magnet to move to said second position.

4. In a coffee percolator having a liquid transfer tube, the combination with a stove having an electric heating element and a magnet arranged to control the current to said heating element by its movement from a first energizing position to a second deenergizing position of an armature resting on the bottom of said percolator and holding said magnet in said first position by its attraction thereto, a hot water pump attached to the lower end of said transfer tube encircling said armature, said pump having a plurality of apertures formed therein, and a float having an inverted cup configuration encircling said tube and attached to said armature, said float being constructed and arranged to move upward under the force of rising water vapor issuing from said apertures thereby to elevate said armature and release said magnet to drop to said second position.

5. A coffee maker comprising a percolator having a liquid transfer tube extending therein, a stove for applying heat to said percolator, means for controlling the amount of heat applied including a switch in the main heating circuit of said stove, a magnet within said stove arranged to operate said switch by its movement from a first energizing position to a second deenergizing position, a bi-lateral armature arranged normally to rest on the bottom of said percolator and to maintain said magnet in said first position by its attraction thereto, a pump attached to the lower end of said tube and having a pair of slots in which said armature is slidably fitted, said pump having a plurality of apertures formed therein, and means for elevating said armature to permit said magnet to move to said second position comprising a float attached to said armature above said pump and having a bell-like configuration adapted to collect water vapor rising from said pump through said apertures, said float having a plurality of vapor escape vents which co-operate with said apertures to regulate the rate of acceleration of vapor pressure under said float.

WALTER R. WEEKS.

REFERENCES CITED

The following references are of record in the file of this patent:

UNITED STATES PATENTS

| Number | Name | Date |
|---|---|---|
| 2,287,571 | Purpura | June 23, 1942 |
| 2,287,583 | Weeks | June 23, 1942 |
| 2,287,584 | Weeks | June 23, 1942 |
| 2,445,591 | Sullivan | July 20, 1948 |